United States Patent
Waterlander

(10) Patent No.: US 8,281,742 B2
(45) Date of Patent: Oct. 9, 2012

(54) SYSTEM FOR MILKING COWS AND METHOD

(76) Inventor: Harmen Waterlander, Dublin, TX (US)

( * ) Notice: Subject to any disclaimer, the term of this patent is extended or adjusted under 35 U.S.C. 154(b) by 134 days.

(21) Appl. No.: 12/714,747

(22) Filed: Mar. 1, 2010

(65) Prior Publication Data

US 2010/0313812 A1    Dec. 16, 2010

Related U.S. Application Data

(60) Provisional application No. 61/186,984, filed on Jun. 15, 2009.

(51) Int. Cl.
*A01K 1/12* (2006.01)
*A01J 5/00* (2006.01)

(52) U.S. Cl. .................................. 119/14.02; 119/14.03

(58) Field of Classification Search ............... 119/14.02, 119/14.03, 14.04, 14.08, 520
See application file for complete search history.

(56) References Cited

U.S. PATENT DOCUMENTS

| | | | |
|---|---|---|---|
| 4,323,033 A | 4/1982 | Vosyka et al. | |
| 6,050,219 A | 4/2000 | van der Lely | |
| 7,017,516 B2 | 3/2006 | Eriksson | |
| 7,073,458 B2 | 7/2006 | Sjolund et al. | |
| 7,270,078 B2 | 9/2007 | Van Den Berg et al. | |
| 7,296,535 B2 | 11/2007 | Ornerfers | |
| 2006/0249083 A1* | 11/2006 | Johansson et al. | 119/14.03 |
| 2008/0017118 A1* | 1/2008 | Wigholm et al. | 119/14.03 |

* cited by examiner

*Primary Examiner* — Rob Swiatek
*Assistant Examiner* — Lisa Tsang
(74) *Attorney, Agent, or Firm* — James Ray & Assoc

(57) ABSTRACT

A system for milking cows including a structure for retaining cows therein. Such structure includes at least one holding area within such structure, at least one exit alley connected to and extending from a predetermined portion of such at least one holding area to at least one of a predetermined housing area, at least one additional holding area, and a combination thereof. At least one of at least one milking robot, at least one automated milking machine, and a combination thereof is disposed within such at least one holding area for automatically milking at least one predetermined cow when such at least one predetermined cow is closely adjacent a predetermined side of such at least one of such at least one milking robot, such at least one automated milking machine, and such combination thereof. A method for milking cows is also provided.

19 Claims, 2 Drawing Sheets

SYSTEM FOR MILKING COWS AND METHOD

CROSS REFERENCE TO RELATED APPLICATION

This patent application is related to and claims priority from U.S. Provisional Patent Application Ser. No. 61/186,984 filed Jun. 15, 2009.

FIELD OF THE INVENTION

The present invention relates, in general, to a system for milking cows and method, more particularly, this invention relates to a system for milking a plurality of cows using automated cow milking machines and milking robots.

BACKGROUND OF THE INVENTION

Prior to the conception and development of the present invention, automated cow milking machines and milking robots, as are generally well known in the prior art, have been used on small farms and in settings where there are generally only a few cows to milk. Unfortunately, in larger settings, use of such automated cow milking machines and milking robots has been unsuccessful due to the fact that such automated milking machines and milking robots are set up for use on a voluntary basis which makes it extremely difficult to keep a systematic approach to the dairy and milking operations.

Specifically of interest to the present invention are the following: Ornerfers, U.S. Pat. No. 7,296,535, discloses a method of automatically milking animals which move freely in an area to visit individually a milking parlor having an automatic milking machine or milking robot.

Van den Berg, U.S. Pat. No. 7,270,078, discloses an assembly for simultaneously feeding and automatically milking animals including a feeding system with a movable feed platform and a drive unit for driving the feed platform.

Sjolund, U.S. Pat. No. 7,073,458, discloses a milking system including a milking stall which an animal may visit to be milked automatically. The milking stall has an animal identifier; a gate controller for opening entry and exit gates; and a milking machine. The milking system may also include a master computer adapted to hold a database of milking animals capable of visiting the milking stall, to identify a milking animal from the animal identifier, and to control the gate controller, and the milking machine.

Eriksson, U.S. Pat. No. 7,017,516, discloses a rotary parlour for milking of animals. The parlour comprises a rotary platform arranged to constitute a support surface for the animals, stalling means arranged to divide the platform into stalls for receiving individual animals, driving means arranged to rotate the platform and milking means arranged to be attached to the animals.

Van Der Lely, U.S. Pat. No. 6,050,219 discloses an apparatus for milking animals, such as cows, comprising a movable floor which carries four milking compartments. Each milking compartment has a computer controlled milking robot.

Vosyka, et al, U.S. Pat. No. 4,323,033, discloses a mobile arrangement for group stabling and treatment of milk cows in rectangular large-capacity cow-houses in which such cows are confiningly stabled and transported for milking. In two cow-house bays which are mirror images of each other, and which are separated one from the other by a milking station and a gridded channel for receiving dung, there are rails for seating movable platforms with individual stabling stands limited by box railings. The platforms in each bay move in paths which are a mirror image of the other; the platforms of the two bays move in parallel paths in the same direction on opposite sides of the milking and treating stations, as well as on opposite sides of the gridded channel.

SUMMARY OF THE INVENTION

The present invention provides a system for milking cows. Such system includes a structure for retaining cows therein. Such structure includes at least one holding area within such structure, at least one exit alley connected to and extending from a predetermined portion of such at least one holding area to at least one of a predetermined housing area, at least one additional holding area, and a combination thereof. At least one of at least one milking robot, at least one automated milking machine, and a combination thereof is disposed within such at least one holding area for automatically milking at least one predetermined cow when such at least one predetermined cow is closely adjacent a predetermined side of such at least one of such at least one milking robot, such at least one automated milking machine, and such combination thereof. A method for milking cows is also provided.

A method for milking cows is also provided. Such method includes: providing a structure including at least one holding area within such structure at least one exit alley connected to and extending from a predetermined portion of such at least one holding area to at least one of a predetermined housing area, at least one additional holding area, and a combination thereof, at least one of at least one milking robot, at least one automated milking machine, and a combination thereof disposed within such at least holding area for automatically milking at least one predetermined cow when such at least one predetermined cow is closely adjacent a predetermined side of such at least one of such at least one milking robot, such at least one automated milking machine, and such combination thereof; providing a predetermined plurality of cows for housing within such at least one holding area; herding each of such plurality of cows to at least one of such at least one milking robot, such at least one milking machine, and such combination thereof for being at least one of milked, evaluated, and a combination thereof; and herding each of such predetermined plurality of cows from such at least one holding area through such exit alley to such at least one of such predetermined housing area, such at least one additional holding area, and such combination thereof after each of such cows has been at least one of milked, evaluated, and such combination thereof.

OBJECTS OF THE INVENTION

It is, therefore, one of the primary objects of the present invention to provide a system of milking cows which is cost efficient, time efficient, and which provides greater stability and consistency for the animals subject to being milked.

Another object of the present invention is to provide a system for milking cows which includes a plurality of milking robots and automated milking machines disposed in predetermined series in a holding area for milking a plurality of cows being driven thereto.

Still another object of the present invention is to provide a system whereby a large number of cows can be managed such that each of such cows is milked two or more times per day by at least one of at least one milking robot, at least one automated milking machine, and a combination thereof.

Yet another object of the present invention is to provide a system of milking cows whereby a plurality of cows are housed in a structure which includes at least one holding area where predetermined numbers of such plurality of cows are milked and evaluated simultaneously by a combination of milking robots implementing milking machines, such milking robots and milking machines set up in series. After being milked, such cows pass from the milking location via an exit alley to at least one of a predetermined housing area, at least one additional holding area, and a combination thereof. Such exit alley may include at least one sort gate for sorting such cows and sending them to such at least one additional holding area, a sick cow room, outside such structure, or another predetermined location.

An additional object of the present invention is to provide a system for milking cows having substantially an assembly line configuration for enabling one individual to oversee the operation of milking a predetermined number of cows.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
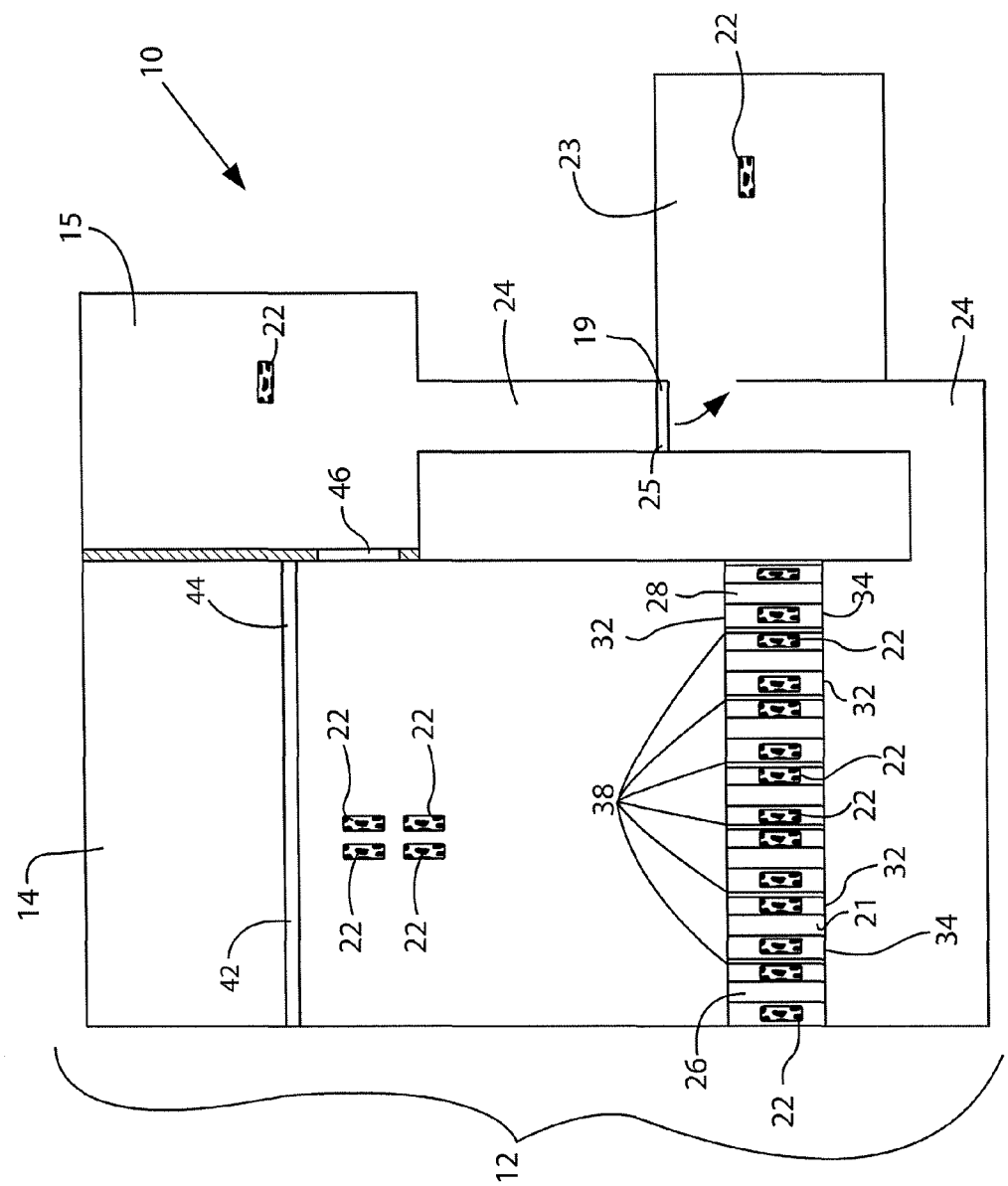
FIG. 1 is a partial perspective view of the invention according to one embodiment of the invention.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 2:
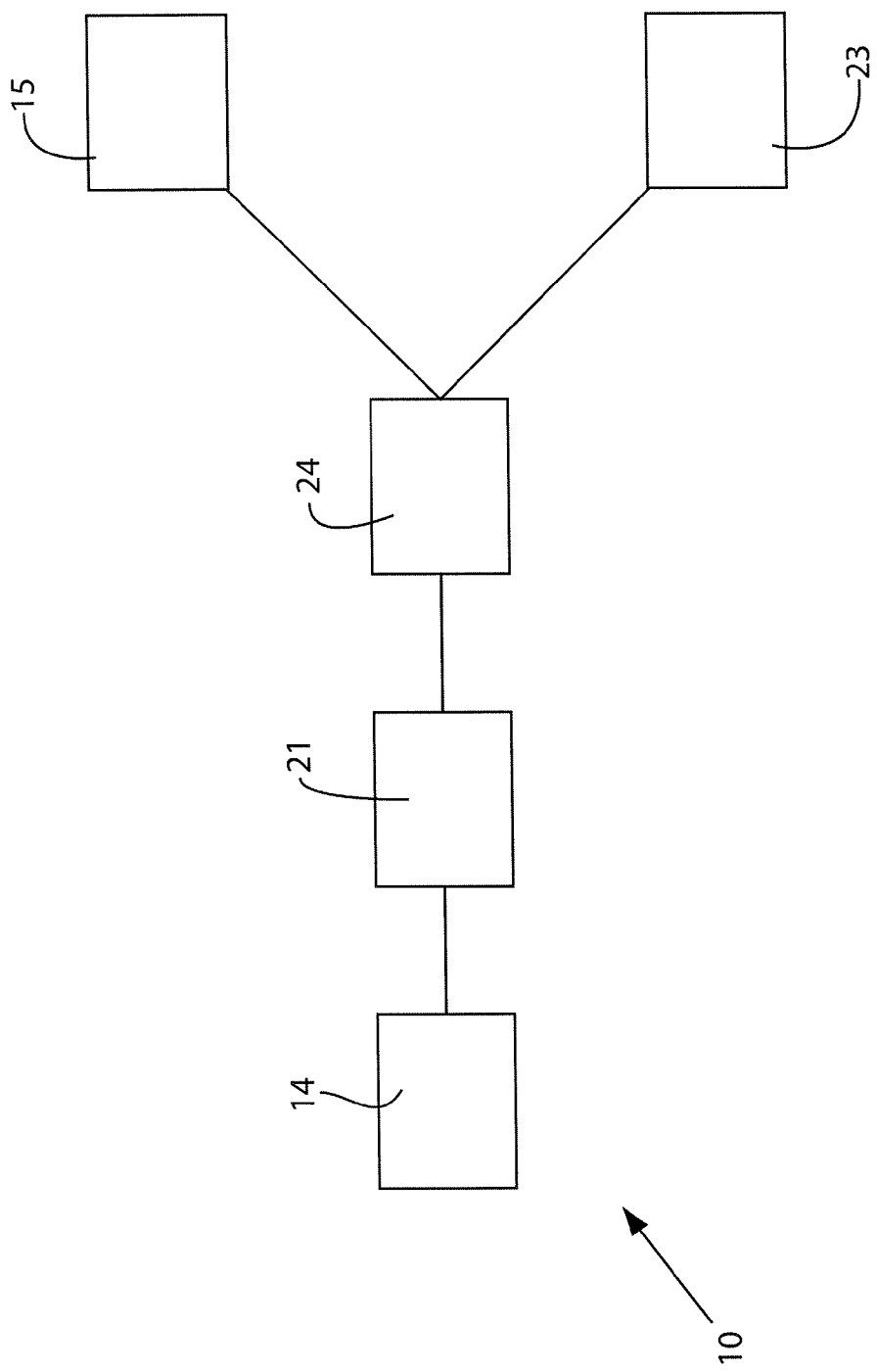
FIG. 2 is a schematic view of the invention according to one embodiment of the invention.

Reference is now made, more particularly, to FIGS. 1-2.

The present invention provides a system for milking cows. Such system, generally designated 10, includes a structure 12 for retaining cows therein. Such structure 12 includes at least one holding area 14 within such structure 12, at least one exit alley 24 connected to and extending from a predetermined portion of such at least holding area to at least one of a predetermined housing area, at least one additional holding area, and a combination thereof, and at least one of at least one milking robot 26, at least one automated milking machine 28, and a combination thereof disposed within such at least one holding area for automatically milking at least one predetermined cow when such at least one predetermined cow is closely adjacent a predetermined side of such at least one of such at least one milking robot 26, such at least one automated milking machine 28, and such combination thereof.

Cows 22 are herded from such at least one holding area to such at least one of a predetermined housing area, at least one additional holding area, and a combination thereof, after having been milked. (As shown in FIGS. 1 and 2, housing area 15 is for healthy cows and housing area 23 is for receiving cows that are in need of medical or other attention; note that area 15 includes a gate 46 which can be opened to allow cows to move from area 15 to such at least one holding area 14 to be milked again).

It is presently preferred that such exit alley 24 includes a sorting means 19 by which such cows can be sorted, such sorting means being operably connected to at least one of such at least one milking robot, such at least one milking machine, and such combination thereof, for receiving information there from to be used in sorting such cows. Preferably, such sorting means is at least one sort gate 25. Such at least one predetermined housing area may be a barn, a stable, a pasture, etc., or may even be the original holding area 14.

It is presently preferred that such system 10 includes a plurality of milking robots, a plurality of automated milking machines, and a combination thereof.

It is further presently preferred that such plurality of milking robots 26, such plurality of automated milking machines 28, and such combination thereof are configured such that two cows 22 may be milked on opposite sides of each milking robot 26, each automated milking machine, and such combination thereof simultaneously.

Furthermore, it is also presently preferred that such plurality of milking robots, automated milking machines, and such combination thereof are disposed within such at least one holding area in a predetermined arrangement such that a predetermined number of cows may be milked simultaneously.

It is preferred that such plurality of milking robots 26, automated milking machines 28, and such combination thereof are disposed within such at least one holding area to form milking stations 21 such that each one of such plurality of cows 22 being herded through the at least one holding area must visit a milking station to be milked prior to exiting from such at least one holding area. Preferably, such milking stations 21 are disposed within such at least one holding area 14 in a predetermined arrangement. It is presently preferred that such predetermined arrangement is at least one of V-shaped, U-shaped, parallel, in series, and a combination thereof.

It is further presently preferred that such milking stations 21 further include enclosure means 32 for enclosing each cow 22 within a predetermined area closely adjacent to each individual milking station 21 such that each cow 22 is unable to leave such predetermined area until milking of such cow is complete. (The term "milking" includes not only physically milking the cow, but also evaluating the cow physically via milk quality and milk temperature). Such enclosure means 32 preferably includes a plurality of automatic gate members 34 operably connected to at least one of such plurality of milking robots 26, such plurality of automated milking machines 28, and such combination thereof. It is meant that as the milking robots 26 and milking machines 28 complete the process of milking each cow 22 the automatic gate members 34 will open to permit such cows 22 to leave the enclosure and allow the next cow 22 to enter. It is further preferred that such enclosure means 32 also includes a plurality of wall members 38 disposed between each of such milking robots 26. A predetermined amount of space will exist between each wall member and each of such milking robots to allow room for a cow to stand between milking robot and wall member.

It is presently preferred that a herding means 42 is operably connected to such at least one holding area 14 for herding such predetermined plurality of cows 22 in a predetermined direction. Preferably such herding means 42 is at least one automated crowd gate 44, also known as a holding pen reducer. It is meant that crowd gates be used to direct movement of such cows towards the milking stations. Preferably, each cow will individually enter the predetermined area closely adjacent to one of the milking robots and thereafter the enclosure means will enclose such cow therein to be milked. The process of milking cows using milking robots and milking machines generally amounts to a cow being herded into a position closely adjacent a milking robot. The milking robot will then sanitize the cow's udder and teats, position the automated milking machine (which generally utilizes teat cups) in place to milk the cow. Milking machines include sensors connected to the teat cups which indicate when the cow is finished milking. Milk from the cups is then transferred to a milk tank located at least one of within such housing, adjacent such housing, and a combination thereof, and the milking robot sanitizes the cow's udder and teats again. Thereafter the enclosure means will be released and the cow will exit the predetermined area closely adjacent such milking robot and pass through the exit alley to a predetermined destination. Once the entire group of cows has been milked the process may be begun again with another group of cows. This system allows one individual to oversee the milking of a large number of cows. The milking robots, automated milking machines, enclosure system, and herding means may be controlled from a central computer system or individual systems. Larger operations may include multiple exit alleys and passages and multiple sort gates for sorting.

A method for milking cows is also provided. Such method includes: providing a structure including at least one holding area within such structure at least one exit alley connected to and extending from a predetermined portion of such at least one holding area to at least one of a predetermined housing area, at least one additional holding area, and a combination thereof, at least one of at least one milking robot, at least one automated milking machine, and a combination thereof disposed within such at least holding area for automatically milking at least one predetermined cow when such at least one predetermined cow is closely adjacent a predetermined side of such at least one of such at least one milking robot, such at least one automated milking machine, and such combination thereof; providing a predetermined plurality of cows for housing within such at least one holding area; herding each of such plurality of cows to at least one of such at least one milking robot, such at least one milking machine, and such combination thereof for being at least one of milked, evaluated, and a combination thereof; and herding each of such predetermined plurality of cows from such at least one holding area through such exit alley to such at least one of such predetermined housing area, such at least one additional holding area, and such combination thereof after each of such cows has been at least one of milked, evaluated, and such combination thereof.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. A system for milking cows comprising:
  a. at least one holding area having a first portion configured to hold cows waiting to be milked, a second portion disposed adjacent said first portion and an automatic gate configured as a holding pen reducer to herd cows from said first portion toward said second portion;
  b. a housing area disposed remotely from said at least one holding area, said housing area configured to house cows in need of medical attention;
  c. at least one of at least one milking robot and at least one automated milking machine disposed within said second portion of said at least one holding area for automatically milking at least one predetermined cow when such at least one predetermined cow is closely adjacent a predetermined side of said at least one of said at least one milking robot and said at least one automated milking machine; and
  d. an exit alley connected to and extending from said second portion of said at least one holding area so as to allow herding of the at least one predetermined cow, when milking of the at least one predetermined cow is complete, directly from said second portion toward said housing area.

2. A system for milking cows according to claim 1 wherein said system includes one of a plurality of milking robots, a plurality of automated milking machines, and a combination thereof.

3. A system for milking cows according to claim 2 wherein said plurality of milking robots, said plurality of automated milking machines, and said combination thereof are configured such that two cows may be milked on opposite sides of one of each milking robot, each milking machine, and a combination thereof simultaneously.

4. A system for milking cows according to claim 2 wherein said one of said plurality of milking robots, said plurality of automated milking machines, and said combination thereof is disposed within said at least one holding area in a predetermined arrangement such that a predetermined number of cows may be milked simultaneously.

5. A system for milking cows according to claim 4 wherein one of said plurality of said milking robots, said plurality of said automated milking machines, and said combination thereof are disposed within said at least one holding area to form milking stations such that each of such cows must visit one of said predetermined milking stations to be milked prior to exiting from said at least one holding area.

6. A system for milking cows according to claim 5 wherein milking stations are disposed within said at least one holding area in a predetermined arrangement.

7. A system for milking cows according to claim 6 wherein said predetermined arrangement is at least one of V-shaped, U-shaped, parallel, and in series.

8. A system for milking cows according to claim 5 wherein each milking station further includes enclosure means for enclosing each cow within a predetermined area closely adjacent to each individual milking station such that each cow is unable to leave said predetermined area until milking of such cow is complete.

9. A system for milking cows according to claim 8 wherein said enclosure means includes a plurality of automatic gate members operably connected to at least one of said plurality of milking robots and said plurality of automated milking machines.

10. A system for milking cows according to claim 9 wherein said enclosure means further includes a plurality of wall members disposed between each of said milking robots.

11. A system for milking cows according to claim 1 wherein said exit alley includes a sorting means for sorting cows operably connected thereto, said sorting means further being operably connected to at least one of said at least one milking robot and said at least one milking machine, said at least one milking machine for receiving information therefrom to be used in sorting such cows, said sorting means configured to sort cows needing medical attention from healthy cows.

12. A system for milking cows according to claim 11 wherein said sorting means is at least one sort gate.

13. A method for milking cows comprising:
 a. providing a structure including:
   i. at least one holding area within said structure, said at least one holding area having a first portion, a second portion disposed adjacent said first portion and an automatic gate configured as a holding pen reducer to herd cows from said first portion toward said second portion;
   ii. at least one exit alley connected to and extending directly from said second portion of said at least one holding area to at least one predetermined housing area disposed remotely from said at least one holding area and configured to hold healthy cows or cows in need of medical attention;
   iii. at least one of at least one milking robot and at least one automated milking machine disposed within said second portion of said at least one holding area for automatically milking at least one predetermined cow when such at least one predetermined cow is closely adjacent a predetermined side of said at least one of said at least one milking robot and said at least one automated milking machine;
 b. providing a predetermined plurality of cows for housing within said first portion of said at least one holding area;
 c. herding each of such plurality of cows to at least one of said at least one milking robot and said at least one milking machine for being at least one of milked, evaluated, or a combination thereof; and
 d. herding each of such predetermined plurality of cows directly from said second portion of said at least one holding area through said exit alley to said at least one predetermined housing area, after each of such cows has been at least one of milked, evaluated, or said combination thereof.

14. A system for milking cows comprising:
 (a) at least one holding area;
 (b) a milking area aligned with one side of said at least one holding area;
 (c) a first gate configured as a holding pen reducer to herd cows from said at least one holding area towards said milking area;
 (d) a first housing area aligned with another side of said at least one holding area;
 (e) a wall separating said first housing area from each of said at least one holding area and said milking area;
 (f) a second gate inset in said wall in proximity to said first gate, said second gate positioned to permit animal passage between said first housing area and said milking area;
 (g) a second housing area disposed adjacent said milking area;
 (h) an exit alley connecting said milking area to each of said first and second housing areas; and
 (i) a third gate mounted in said exit alley in a position to direct cows exiting said milking area into said first housing area or into said second housing area.

15. The system for milking cows of claim 14, wherein said milking area includes only one row of enclosures and a milking station disposed between a pair of adjacent enclosures.

16. The system for milking cows of claim 15, including a wall between a pair of adjacent enclosures.

17. The system for milking cows of claim 15, wherein said milking station includes one of a milking robot and a milking machine.

18. The system for milking cows of claim 14, wherein said first gate spans the entire width of said at least one holding area.

19. The system for milking cows of claim 14, wherein said third gate is mounted for movement between a pair of positions, wherein said third gate is operable in one position to direct cows into said first housing area and operable in another position to direct the cows into said second housing area.

* * * * *